Aug. 13, 1968  L. MÜLLER  3,396,805
VIBRATING DEVICES

Filed Jan. 3, 1966  3 Sheets-Sheet 1

Inventor:
Ludwig Müller
BY Hane and Nydick
ATTORNEYS

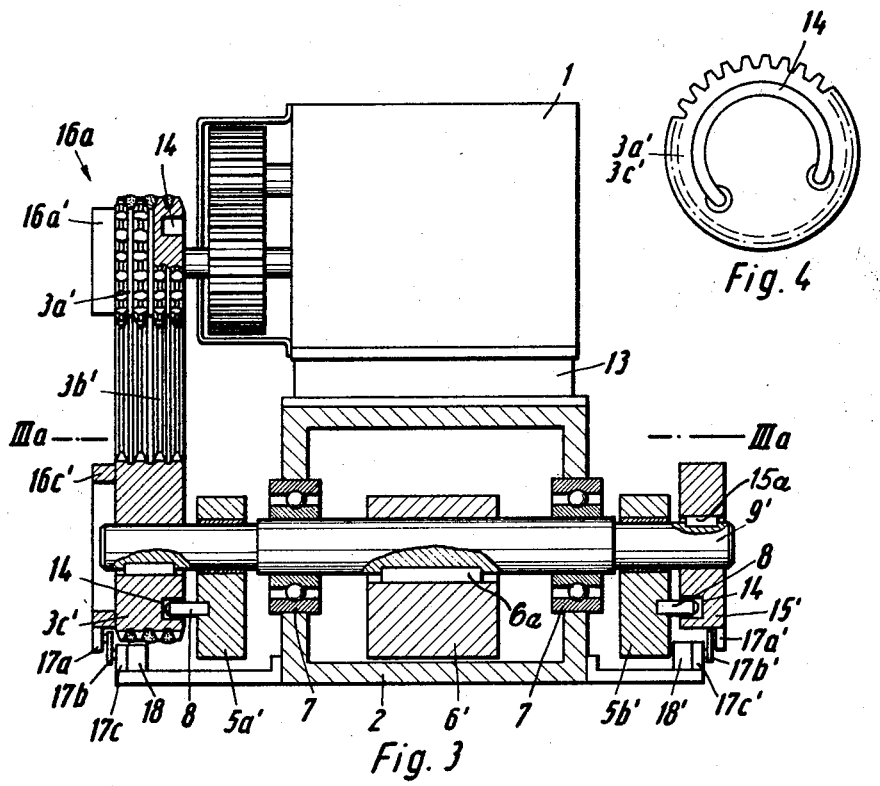
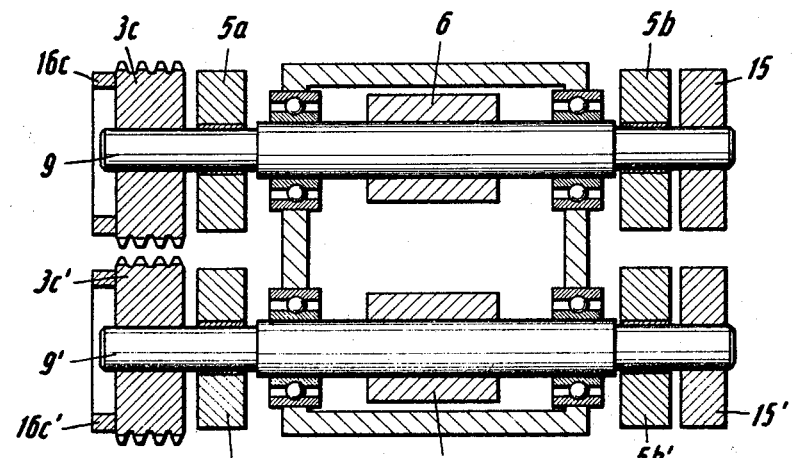

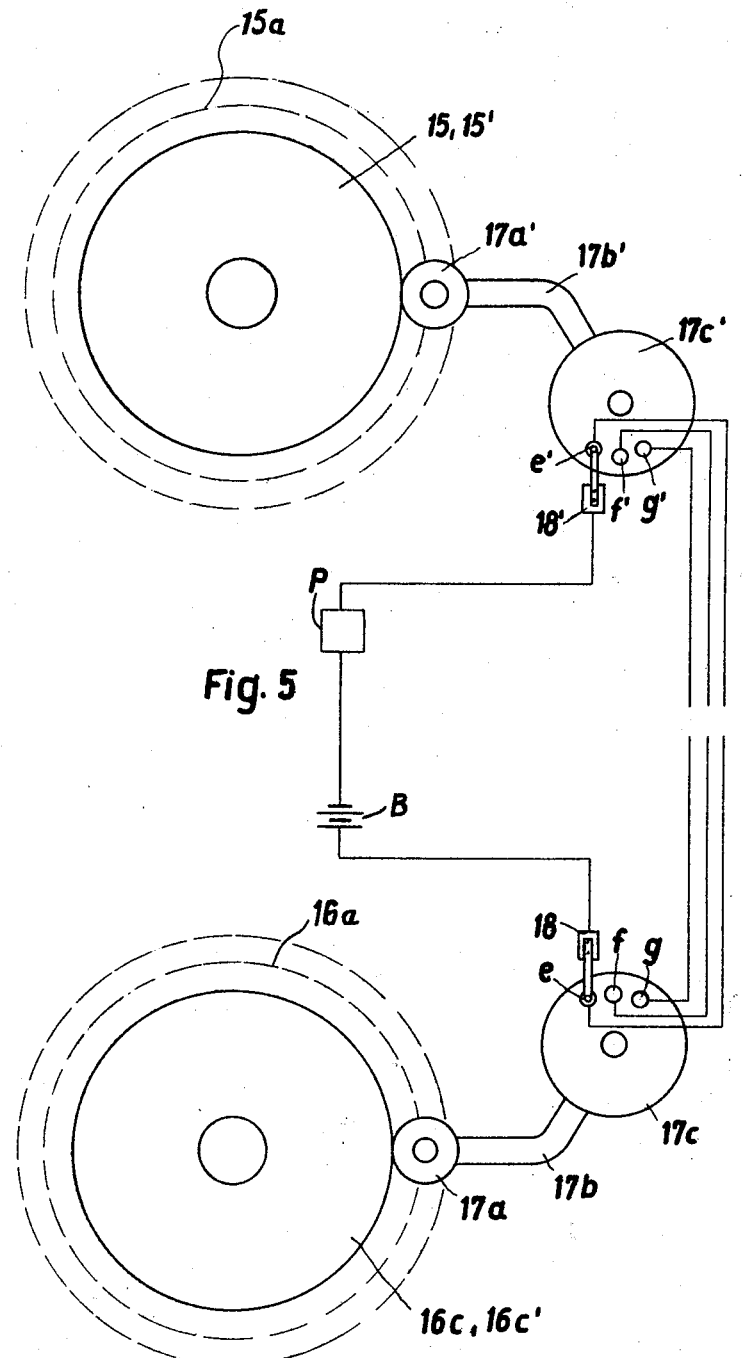

United States Patent Office 3,396,805
Patented Aug. 13, 1968

3,396,805
VIBRATING DEVICES
Ludwig Müller, 44–46 Heinrich Heine-Str.,
355 Marburg an der Lahn, Germany
Filed Jan. 3, 1966, Ser. No. 518,102
10 Claims. (Cl. 173—49)

ABSTRACT OF THE DISCLOSURE

There is shown a centrifugal vibrating device for generating directional vibrations as are used for pile driving operations. The device comprises a main imbalance member which is rotated by driving a shaft seating the same and an auxiliary imbalance member which is also rotated and the angular position of which in reference to the main imbalance member can be changed, thereby correspondingly varying the magnitude of the imbalance action added by the auxiliary member to the imbalance action of the main member. The device also comprises means for varying the ratio of the transmission by which the main imbalance member is coupled to a drive motor and safety means to assure that the desired ratio of transmission is actually present.

---

The present invention relates to a centrifugal vibrating device for generating directional vibrations, and more particularly, to a centrifugal vibrating device in which an imbalance member is mounted on a rotary shaft or several such members are mounted on a corresponding number of mutually parallel shafts.

Vibrating devices of this kind are particularly suitable for use as pile driving or pile ramming devices and are widely used for such purpose.

The use of vibrating devices of the general kind above referred to for pile driving and other purposes makes it necessary, or at least desirable, to vary the characteristics of the vibrations produced by the devices. Basically, the vibration characteristics can be varied by changing the static moment of the imbalance members by the addition or removal of mass coacting with the imbalance members, or by changing the rotational speed of the imbalance members. However, the range within which the static moment of the imbalance members may be changed by adding or subtracting mass is limited by the loads acceptable at the bearings for the rotary shaft on which the imbalance member or members are mounted. Accordingly, changes in mass, particularly changes by addition of mass, require specialized knowledge to avoid damage to the vibrating devices and such specialized knowledge is frequently not readily available, especially at a construction site.

It is a broad object of the present invention to provide a novel and improved vibrating device, the vibration output of which can be varied without requiring special skill and in a convenient and simple manner.

A more specific object of the invention is to provide a novel and improved vibrating device of the general kind above referred to which permits a convenient setting of the device for a substantial number of predetermined vibration output ranges.

The aforementioned objects, features and advantages and other objects, features and advantages which will be pointed out hereinafter are attained by associating with at least one fixed imbalance member of the device, one or several auxiliary imbalance members which are movable within a predetermined range in reference to the fixed imbalance member, preferably by turning the movable imbalance member through a predetermined angle relative to the fixed imbalance member. As it is evident, such variation in the position of the movable imbalance member causes a corresponding variation in the vibration output of the device. The auxiliary member is preferably rotatably seated on the same shaft as the fixed imbalance member.

The movements of the auxiliary member or members are preferably limited in either direction by stop means. The limits for the turning or other movement of the auxiliary imbalance member or members are advantageously so selected that in no position thereof the load at the shaft bearings exceeds a safe value. To effect such limited movement, each auxiliary member may be coupled to a drive gear fixedly seated on the rotary drive shaft for the imbalance members by a circumferentially limited guide groove or slot in the gear and an engaging drive pin on the auxiliary member, or vice versa. The circumferential length of the guide should be such that the acceptable bearing load is not exceeded in either limit position of the respective auxiliary member.

Assuming that two fixed imbalance members and two angularly movable auxiliary imbalance members for each fixed member are provided, then a reversal of the rotational direction of either fixed imbalance member produces two different vibration outputs. Further variations of the vibration output may be conveniently obtained by driving the imbalance members by means of a gear train, the transmission ratio of which is changeable by exchanging one or several gears in the train. Some, or all, of the gears in the train may include the aforedescribed guide-pin coupling, thereby providing further settings for changes in the vibration output of the device.

As it is evident, with one pair of gears, a reversal of the rotational direction results in two different vibration outputs, and an exchange of one gear produces two further output variations. Hence, with two pairs of gears, eight different output variations are obtainable by changing gears and reversing the rotational direction thereof. Each of the aforedescribed guides in the gears or in the auxiliary imbalance members has preferably a length such that the acceptable bearing load is not exceeded in any position of the auxiliary members. Hence, the output settings of a vibrating device according to the invention can be effected by comparatively unskilled workmen without danger of damage to the device.

The auxiliary imbalance members are preferably mounted at an equal distance from the fixed imbalance member and on opposite sides thereof so that the direction of the vibrations is not changed when the vibration output is changed.

In the accompanying drawing, several preferred embodiments are shown by way of illustration and not by way of limitation.

In the drawing:

FIG. 3 is a sectional view similar to FIG. 2 but showing a modification thereof;

FIG. 3a is a sectional view taken on line IIIa—IIIa of FIG. 3;

Figure 2:
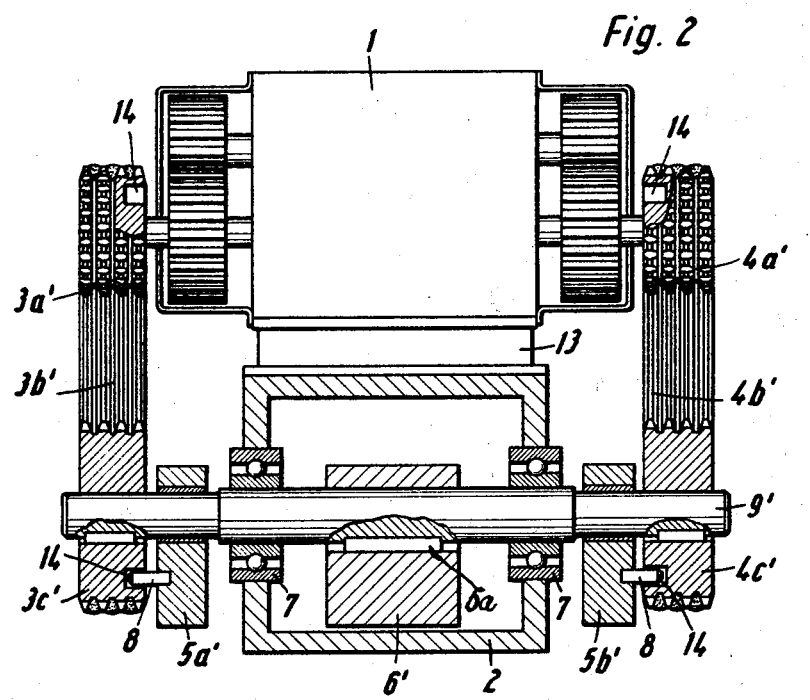
FIG. 2 is a lengthwise section through one of the rotary shafts and the imbalance members of the vibrating device.
Figure 1:
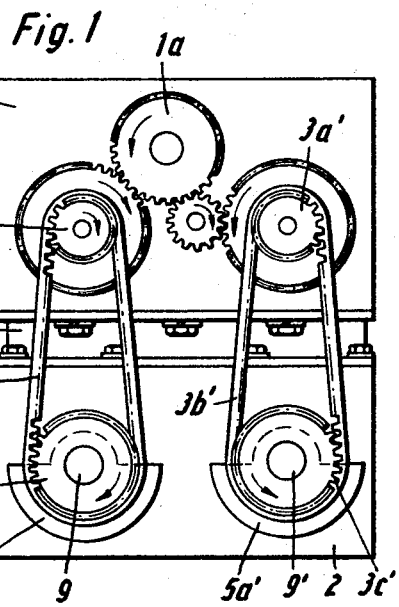
FIG. 1 is a diagrammatic elevational view of a vibrating device according to the invention as seen upon the lefthand side of FIG. 2.
Figure 1A:
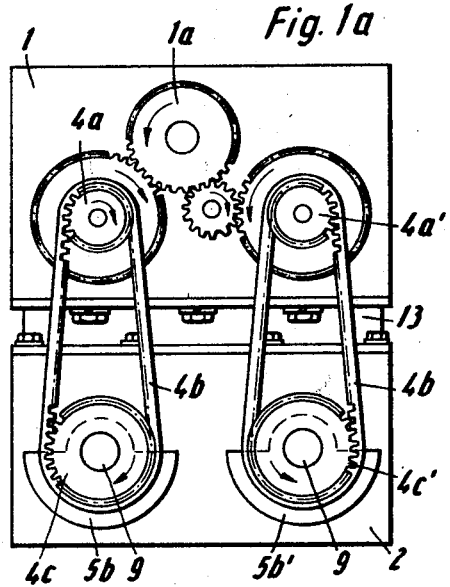
FIG. 1a is a similar diagrammatic elevational view but seen upon the righthand side of FIG. 2.

FIG. 4 is a detailed view of a component suitable for use either with the device according to FIGS. 1, 1a and 2 or according to FIGS. 3 and 3a; and FIG. 5 is a diagrammatic view of a comparing safety means constituting part of the device according to FIGS. 3 and 3a.

Referring first to FIGS. 1, 1a, 2 and 4, the vibrating device as exemplified in these figures comprises a diagrammatically shown power drive means 1, such as an electric motor, mounted on a frame structure 13, also supporting a housing 2, which includes the vibrating assembly proper. The vibrating assembly comprises two parallel rotary shafts 9 and 9' journalled in bearings 7. The two shafts have fixedly seated thereon, for instance, by means of keys 6a, imbalance members 6 and 6'. Each of the fixed imbalance members is associated with a pair of auxiliary imbalance members 5a, 5a' and 5b, 5b', respectively. The auxiliary imbalance members are rotatable on the shafts as it is indicated by bearing sleeves or bushings.

The two shafts 9 and 9' are drivingly coupled to motor 1 by a suitable transmission means, preferably a chain or belt drive 3b, 3b' and 4b, 4b'. The chains of the drive are guided and driven by gears 3c, 3a and 3c', 3a' on the left hand side of the device as shown in FIG. 2 and by gears 4c, 4a and 4c', 4a' on the right hand side of the device.

As can best be seen in FIG. 4, at least some of the gears, and preferably all of the gears, include an arcuate guide groove or slot 14, each engaged by a driving pin 8 extending from auxiliary imbalance members 5a, 5a' and 5b, 5b' as can be readily understood from the figures and is shown in FIG. 2 for members 5a' and 5b'. The guide grooves can also be provided in the auxiliary members, in which case the driving pins are secured to the respective gears. As it is evident, the angular positions of the auxiliary members in reference to the respective gears are controlled by the circumferential lengths of guide grooves 14. These lengths are so selected that in no position of the auxiliary members in reference to the gears and thus also in reference to the fixed imbalance members 6 and 6', the bearing loads exceed a predetermined acceptable value.

When shafts 9 and 9' are rotated by motor 1 via the chain drive, the fixed imbalance members 6 and 6' will immediately participate in such rotation, but each driving pin 8 will freely slide in the respective guide groove 14 until it engages the respective end of the groove, whereupon the auxiliary imbalance members will also participate in the rotation of shafts 9 and 9'. The angular positions of the auxiliary members in reference to the fixed imbalance members are determined by the rotational direction of the shafts 9 and 9' and hence the vibration output of the device is also determined by the rotational direction. When now the direction of motor 1 is reversed, either directly at the motor or by means of its gearing 1a, the characteristic of the vibrations will be correspondingly changed as the positions of the auxiliary members in reference to the fixed imbalance members change when the rotational direction of the shafts is reversed.

As previously described, further changes in the vibration output may be effected by changing the transmission ratio between the drive shaft of motor 1 and shafts 9 and 9'. This can be effected by changing one or several of the gears in the gear trains between the motor and the shafts. As it is evident, a substantial number of different transmission ratios is readily obtainable by suitably combining the coacting gears and each transmission ratio will result in a predetermined vibration output of the device. Still other predetermined variations of the vibration outputs may be obtained by providing guide grooves 14 of different circumferential lengths. However, in each case, the predetermined vibration output should be so calculated that the permissible bearing loads will not be exceeded.

Turning now to FIGS. 3, 3a and 5, the device exemplified in these figures uses the same principle as the previously described device, but the two-sided drive of FIGS. 1 and 2 is replaced by a one-sided drive. The transmission means for this drive may again be a belt or chain drive including gears 3a' 3c and 3c'. There is, of course, provided similar to the previously described gears, a gear coacting with gear 3c' and corresponding to gear 3a'. The auxiliary imbalance members 5a and 5a' are coupled with gears 3c, 3c', respectively, by the aforedescribed arcuate guide grooves 14 and driving pins 8, but auxiliary imbalance members 5b and 5b' are driven by means of driving discs 15 and 15', respectively. These discs are detachably seated on shafts 9 and 9' secured against rotation by keys 15a. Each of driving discs 15 and 15' includes a guide groove 14, as previously described, engaged by a driving pin 8. Of course, the guide grooves may be in the auxiliary members and the driving pins may extend from the drive discs.

The device operates as previously described in connection with FIGS. 1, 1a and 2. Changes in the vibration output can be obtained by reversing motor 1 or exchanging the gear ratio in the transmission between the drive shaft of the motor and shafts 9, 9'. In addition, changes in vibration output are obtainable by exchanging the illustrated drive discs 15 and 15' for discs including guide grooves 14 of a length different from the length of the grooves in the illustrated discs.

As it is evident from the previous description, it is important for the operation of the device as shown in FIGS. 3 and 3a that the driving discs and the gear ratio of the transmission are correctly matched and especially that the driving discs match gears 3c and 3c' secured on shafts 9 and 9', respectively. To assure such correct matching, a comparing or control means is provided. As is shown in FIGS. 3 and 3a, the safety means comprise axially protruding hubs 16c and 16c' on gears 3c and 3c' respectively, coacting with driving discs 15 and 15', respectively. The outer diameters of these hubs may be different for each of the gears. In the exemplification shown in FIGS. 3 and 3a, the external diameter of discs 15, 15' equals the outer diameter of hubs 16c and 16c'. The safety means further comprises, as can best be seen in FIG. 5, a probe in the form of a roller 17a and 17a' supported by an arm 17b and 17b', respectively. Each arm is secured to a contact disc 17c and 17c', respectively, rotatable about a center axis as is indicated. Each disc mounts several circumferentially spaced contacts, three contacts e, f, g and e' f', g', respectively, being shown. Contacts e, e'; f, f'; and g, g' are interconnected. As it is evident, the angular positions of the contact discs are controlled by the diameters of the driving discs 15, 15' and hubs 16c, 16c'. The disc contacts coact with stationary switch arms 18 and 18', respectively. These switch arms should be visualized as being included in a diagrammatically indicated control circuit indicated by a block P connected to a source of current B. This circuit, when activated, may produce an audible or visual signal or initiate some control function, such as starting motor 1. Control circuits of this kind are well known in the art and do not constitute part of the invention.

The contacts on the two contact discs are so correlated that corresponding interconnected contacts such as e and e' close to the control circuit P when the diameters of the driving discs 15, 15' and of hubs 16c, 16c' match each other. As exemplified, the compared diameters of the disks and hubs are alike as required for correct matching of the transmission and accordingly, contacts e and e' are connected to close the control circuit. As is clearly shown in FIG. 5, the control circuit P is closed via battery B, switch arm 18, contacts e and e', and switch arm 18'. The two arms 17b and 17b' are in symmetric positions.

FIG. 5 further indicates by dashed circles 15a and 15b respectively, possible different diameters for driving disks 15 and 15' and for hubs 16c or 16c' for exchangeable gears 3c and 3c' respectively.

Let it now be assumed that the diameter of either driving disk 15 or 15' corresponds to the intermediate circle 15a while the diameter of gear 16c corresponds to the full line circle due to an oversight when an adjustment of the desired total force of imbalance is made. As a result, roller 17a will continue to ride on the circumference of hub 16c but roller 17a' will now ride on the circumference of circle 15a. As a result, disk 17c' is turned by arm 17b' into a position in which contact arm 18' is disengaged from contact e' and engaged with contact f' while contact e remains engaged with contact arm 18. Accordingly, the control circuit P is interrupted at e' thereby initiating a suitable control action such as stopping the motor for driving shaft 9.

Assuming now that both roller 17a' and roller 17a ride on circles 15a and 16a respectively, contact arms 18' and 18 will engage contacts f' and f respectively, thereby closing the control circuit. The same is of course true when the outermost circle is engaged by the same rollers.

A similar comparing safety means, can of course, be provided between hub 16c' and a hub 16a' axially extending from gear ring 3a'.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A vibrating device comprising in combination:
a rotatable shaft;
an imbalance member fixedly seated on said shaft;
an auxiliary imbalance member rotatably seated on said shaft;
coupling means coupling said auxiliary member to said shaft for rotation of said member by rotation of the shaft, said coupling member including limit means permitting a limited rotation of the auxiliary member in either direction in reference to the shaft; and
drive means for driving said shaft and said members seated thereon, the angular position of the auxiliary member in reference to the imbalance member within said limited range of rotation being controlled by the rotational direction of said shaft.

2. A vibrating device according to claim 1 and comprising a second auxiliary imbalance member rotatably seated on said shaft, second coupling means coupling said second auxiliary member to said shaft for rotation thereof by rotation of the shaft, said second coupling means including limit means permitting a limited rotation of the second auxiliary member in either direction in reference to the shaft, said auxiliary imbalance members being disposed on opposite sides of said fixedly seated imbalance member symmetrically spaced therefrom.

3. A vibrating device according to claim 1, wherein said drive means comprise a driving gear and wherein said coupling means couples said gear to said rotatable auxiliary imbalance member, the limit means included in said coupling comprising an arcuate guide means and a pin means engaged with said guide means, one of said means being on the gear and the other on the auxiliary member, the length of said guide means limiting the angular rotation of the auxiliary member in reference to said fixed imbalance member.

4. A vibrating device according to claim 3, wherein said driving gear is fixedly seated on said shaft for rotation in unison therewith.

5. A vibrating device according to claim 1, wherein said drive means comprises a drive motor, a gear fixedly seated on said shaft and a transmission means coupling said motor to said gear, and wherein said coupling means couples said gear to said auxiliary member, the limit means included in said coupling comprising an arcuate guide means and a pin means engaged with the guide means, one of said means being on the gear and the other on the auxiliary member, the length of said guide means limiting the angle of rotation of the auxiliary member in reference to the fixed imbalance member.

6. A vibrating device according to claim 5 wherein said transmission means comprises a gear train including detachable gears to vary the transmission ratio of said gear train.

7. A vibrating device according to claim 1 and comprising a second auxiliary imbalance member rotatably seated on said shaft, said auxiliary members being disposed on opposite sides of the fixed imbalance member, a driving disc fixedly seated on said shaft adjacent to said second auxiliary member, said coupling means coupling said disc to said second auxiliary member, the limit means in said coupling means including an arcuate guide means and a pin means engaged with the guide means, one of said means being on the gear and the other on the auxiliary member, the length of said guide means limiting the angle of rotation of the second auxiliary member in reference to the fixed imbalance member.

8. A vibrating device according to claim 7, wherein said driving disc is detachably mounted on said shaft secured against rotation in reference thereto.

9. A vibrating device according to claim 7, wherein said coupling means comprises a gear fixedly secured on said shaft and coupled to said first auxiliary imbalance member, a drive motor and a gear train coupling said motor to said fixedly seated gear and including at least one detachable gear, said detachable gear and said driving disc, each having an axially protruding hub, and wherein comparing means compare the external diameter of said driving disc and the external diameter of the hub of said detachable gear, said comparing means including a control circuit activated in response to a predetermined relationship between said external diameters.

10. A vibrating device according to claim 9, wherein said comparing means comprise a pair of rotatable contact discs, each mounting several circumferentially spaced contacts, each two correspondingly situated contacts on the two discs being connected with each other, a stationary switch arm for each of said discs engageable with the contacts thereon, each of said switch arms being connected to said control circuit, and a pair of pivotal probes each coacting with the disc and the hub of the detachable gear to probe the respective diameters thereof, each of said probes being coupled with the respective contact disc to rotate the same into an angular position corresponding to the diameters of said disc, said control circuit being activated when both switch arms engage a pair of corresponding contacts.

References Cited
UNITED STATES PATENTS

| | | | |
|---|---|---|---|
| 2,677,967 | 5/1954 | Galbraith | 74—87 |
| 2,831,353 | 4/1958 | Ongaro | 74—61 |
| 2,852,946 | 9/1958 | Petrin | 74—61 |
| 3,097,537 | 7/1963 | Peterson | 74—61 |
| 3,158,038 | 11/1964 | Goodman | 74—87 |
| 3,190,369 | 6/1965 | Pyles | 173—49 |
| 3,208,292 | 9/1965 | Austin et al. | 74—61 |

NILE C. BYERS, JR., *Primary Examiner.*